US 6,691,806 B2

(12) United States Patent
Wolfgang et al.

(10) Patent No.: US 6,691,806 B2
(45) Date of Patent: Feb. 17, 2004

(54) DRIVE UNIT FOR A TRACK-LAYING VEHICLE

(75) Inventors: Werner Wolfgang, Ravensburg (DE); Hubert Hund, Meckenbeuren (DE); Thomas Rösch, Immenstaad (DE); Bruno Walter, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 10 days.

(21) Appl. No.: 10/181,681

(22) PCT Filed: Feb. 2, 2001

(86) PCT No.: PCT/EP01/01116

§ 371 (c)(1),
(2), (4) Date: Jul. 18, 2002

(87) PCT Pub. No.: WO01/58743

PCT Pub. Date: Aug. 16, 2001

(65) Prior Publication Data

US 2003/0015356 A1 Jan. 23, 2003

(30) Foreign Application Priority Data

Feb. 8, 2000 (DE) .......................................... 100 05 527

(51) Int. Cl.⁷ .......................... B62D 52/12; B62D 11/22
(52) U.S. Cl. ...................... 180/6.7; 180/9.23; 180/65.4; 180/65.6
(58) Field of Search .............................. 180/6.7, 9, 9.1, 180/9.23, 65.1–65.4

(56) References Cited

U.S. PATENT DOCUMENTS

| 4,554,989 A | 11/1985 | Gruich et al. ............... 180/65.4 |
| 5,509,491 A * | 4/1996 | Hall, III ....................... 180/6.7 |
| 5,861,569 A | 1/1999 | Abels ........................ 89/36.08 |
| 6,216,807 B1 | 4/2001 | Eckhoff ....................... 180/6.7 |
| 6,527,070 B2 * | 3/2003 | Ryan ........................... 180/6.7 |

FOREIGN PATENT DOCUMENTS

| DE | 195 37 945 A1 | 4/1997 | ............ B62D/55/00 |
| DE | 197 56 683 C1 | 6/1999 | ............ B62D/55/00 |
| EP | 0 924 132 A2 | 6/1999 | ............ B62D/11/04 |
| WO | 98/40235 | 9/1998 | ............. B60K/7/00 |

* cited by examiner

Primary Examiner—Lesley D. Morris
Assistant Examiner—Matthew Luby
(74) Attorney, Agent, or Firm—Davis & Bujold, PLLC

(57) ABSTRACT

The invention concerns a drive unit for a tracked vehicle with a first and a second electric generator (6, 8) and with a first and a second internal combustion engine (10, 12), such that one generator (6, 8) can be driven respectively by one combustion engine (10, 12), and with electric drive motors (14, 16, 18, 20) for driving a right-hand and a left-hand drive track (4, 2). According to the invention it is proposed that the elements of the drive unit are linked in such manner that the right-hand drive track (4) is associated with first and second right-hand electric drive motors (14, 16), the left-hand drive track (2) is associated with first and second left-hand electric drive motors (18, 20), the two first drive motors (14, 18) being fed by the first generator (6) and the two second drive motors (16, 20) being fed by the second generator (8). Due to the wiring of the energy paths according to the invention, very great operational security is achieved even when the drive unit is partially damaged.

3 Claims, 1 Drawing Sheet

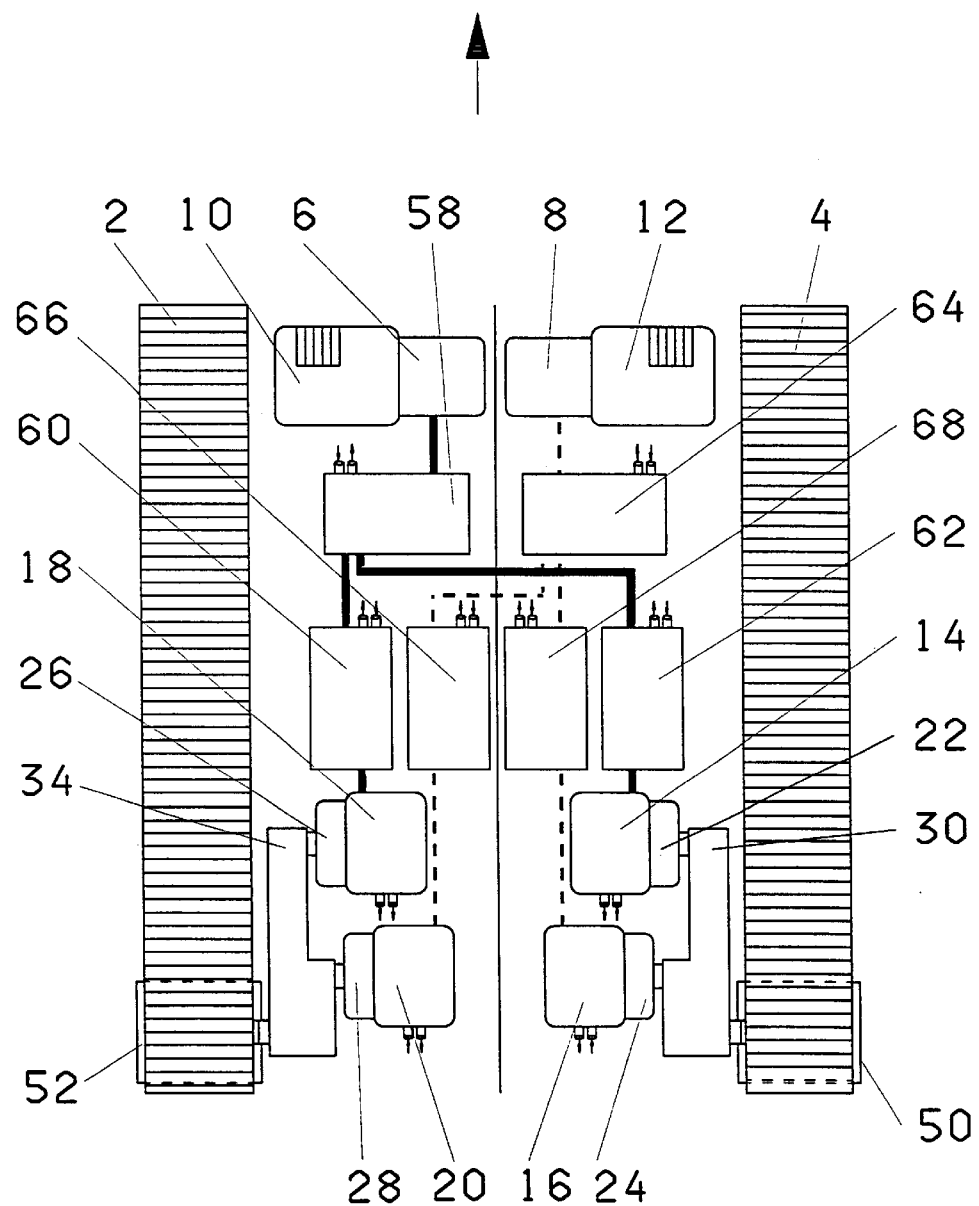

DRIVE UNIT FOR A TRACK-LAYING VEHICLE

FIELD OF THE INVENTION

The invention concerns a drive unit for a tracked vehicle according to the pre-characterizing portion of the principle claim.

BACKGROUND OF THE INVENTION

In tracked vehicles, especially ones used for military purposes, the drive unit is required to be extremely reliable. Even if the vehicle is partially damaged, it must be guaranteed that the vehicle can be moved out of a danger zone without outside help.

In electrically driven tracked vehicles emergency operation can be maintained because the aggregates on either side can be coupled to one another. EP 0 924 132 A2, which is considered to be the closest prior art, describes a drive unit for a tracked vehicle that consists of two drive units arranged on either side of the vehicle body. Each drive unit has a drive motor, which drives an electric generator. The drive tracks can be driven by associated electric motors.

DE 195 37 945 A1 shows a drive unit for a tracked vehicle, in which the power is divided among 4 motors.

The purpose of the invention is to provide a drive unit for a tracked vehicle, which ensures greater reliability and operating security even when the vehicle is partially damaged. In addition, standard components and aggregates of suitable structural volume should be able to be used.

This objective is achieved by a drive unit for tracked vehicles, which also embodies the features of the characterizing portion of the principle claim.

SUMMARY OF THE INVENTION

According to the invention, a first and a second right-hand electric drive motor are associated with the right-hand drive track and a first and a second left-hand electric drive motor are associated with the left-hand drive track. The two first drive motors are fed by a first generator and the two second drive motors are fed by a second generator.

The result is that if any component of the drive unit is out of action, the tracked vehicle can still be driven and steered. For example, if the first internal combustion engine or the first generator is out of action, the second combustion engine and the second generator, and the second left-hand and second right-hand drive motors are still there to drive the two drive tracks. If one or both first drive motors or one or both second drive motors fail, there is still a drive motor available to drive each drive track.

In an advantageous embodiment of the invention, each drive track is associated with a summation unit by means of which the drive power respectively of a first and a second electric drive motor is coupled to a track drive wheel. Compared with an arrangement in which each drive track is respectively driven by a front and a rear track drive wheel, this has the advantage that stresses in the drive track are avoided.

If the generators and electric drive motors are alternating-current machines, the energy paths can advantageously be wired as follows: the output of the first generator is connected electrically to the input of a first rectifier. The output of the second generator is electrically connected to the input of a second rectifier. The output of the first rectifier is simultaneously connected electrically to the input of a first left-hand and a first right-hand DC/AC converter. The output of the second rectifier is simultaneously connected electrically to the input of a second left-hand and a second right-hand DC/AC converter. The output of each DC/AC converter is connected electrically to the input of an associated drive motor.

BRIEF DESCRIPTION OF THE DRAWING

The invention will now be described, by way of example, with reference to the accompanying drawings in which:

FIG. 1 schematically illustrates the components of the drive unit and their wiring.

DETAILED DESCRIPTION OF THE INVENTION

The output of the alternating-current generator 6 driven by the first combustion engine 10 is connected electrically to the input of a first rectifier 58. The output of this rectifier 58 is divided into two paths. It is connected electrically, simultaneously to the input of a first left-hand DC/AC converter 60 and a first right-hand DC/AC converter 62. The output of the first left-hand DC/AC converter 60 is connected to the input of the first right-hand electric drive motor 18. The output of the first right-hand DC/AC converter 62 is connected to the input of the first right-hand electric drive motor 14. The second generator 8, the second amplifier 64, the second right and left DC/AC converters 66, 68 and the right and left second electric drive motors 16, 20 are wired in the corresponding way.

By virtue of the redundant presence of the components and the way they are wired, very great operational security is achieved even when the drive unit is partially damaged. Due to the structure of the drive unit according to the invention, the necessary drive power is produced and transmitted by several small components. Due to the use of components that take up only little space, the structural space available can be used more flexibly. Since no individual component has to be designed to provide all the power required, the components used can be readily available, inexpensive and mass-produced ones.

List of index numbers 2 left-hand drive track
4 right-hand drive track
6 first electric generator
8 second electric generator
10 first internal combustion engine
12 second internal combustion engine
14 first right-hand electric drive motor
16 second right-hand electric drive motor
18 first left-hand electric drive motor
20 second left-hand electric drive motor
22 gear train
24 gear train
26 gear train
28 gear train
30 summation gear
34 summation gear
50 track drive wheel
52 track drive wheel
58 first rectifier
60 first left-hand DC/AC converter
62 first right-hand DC/AC converter
64 second rectifier
66 second left-hand DC/AC converter
68 second right-hand DC/AC converter

What is claimed is:

1. A drive unit for a tracked vehicle with a first and a second electric generator (6, 8) and a first and a second internal combustion engine (10, 12), in which said first generator (6) can be driven respectively by said first combustion engine (10) and electric drive motors (14, 16, 18, 20) for driving a right-hand and a left-hand drive track (4, 2), wherein said elements of the drive unit are linked together, the right-hand drive track (4) is associated with first and second right-hand electric drive motors (14, 16), the left-hand drive track (2) is associated with first and second left-hand electric drive motors (18, 20), the two first drive motors (14, 18) being driven by the first generator (6) and the two second drive motors (16, 20) being driven by the second generator (8).

2. The drive unit according to claim 1, wherein each of the right-hand and left-hand drive tracks (2, 4) is associated with a summation unit (30, 34) by means of which the drive power of the associated first and second electric drive motors (14, 18, 16, 20), is coupled to a track drive wheel (50, 52).

3. The drive unit according to claim 1, wherein the generators (6, 8) and the electric drive motors (14, 16, 18, 20) are alternating-current machines, the output of the first generator (6) is connected electrically to the input of a first rectifier (58), the output of the second generator (8) is connected electrically to the input of a second rectifier (64), the output of the first rectifier (58) is connected electrically simultaneously with the input of a first left-hand and a first right-hand DC/AC converter (60, 62), the output of the second rectifier (64) is connected electrically simultaneously to the input of a second left-hand and a second right-hand DC/AC converter (66, 68), and the output of each DC/AC converter (60, 62, 66, 68) is electrically connected to an associated drive motor (18, 14, 20, 16).

* * * * *